United States Patent [19]
Hori

[11] Patent Number: 5,621,757
[45] Date of Patent: Apr. 15, 1997

[54] CIRCUIT FOR MEASURING ELECTRIC FIELD BY RAPID MEASUREMENT AND NORMAL MEASUREMENT IN A MOBILE COMMUNICATION SYSTEM AND METHOD OF USING SAME

[75] Inventor: Tsuguo Hori, Tokyo, Japan

[73] Assignee: NEC Corporation, Japan

[21] Appl. No.: 551,433

[22] Filed: Nov. 1, 1995

Related U.S. Application Data

[63] Continuation-in-part of Ser. No. 230,616, Apr. 21, 1994, abandoned.

[30] Foreign Application Priority Data

Apr. 22, 1993 [JP] Japan ..................... 5-096071

[51] Int. Cl.⁶ ............... H04B 3/46; H04B 17/00; H04L 27/06
[52] U.S. Cl. ............ 375/224; 375/344; 455/226.2; 455/260
[58] Field of Search ............... 375/224, 227, 375/228, 344, 293, 327, 376; 455/226.1, 226.2, 226.3, 226.4, 255, 256–260, 264, 265, 343

[56] References Cited

U.S. PATENT DOCUMENTS 5,203,030  4/1993  Kawasaki ............... 455/260
5,396,521  3/1995  Minami ................... 375/344
5,402,446  3/1995  Minami ................... 375/344

*Primary Examiner*—Stephen Chin
*Assistant Examiner*—Hai H. Phan
*Attorney, Agent, or Firm*—Ostrolenk, Faber, Gerb & Soffen, LLP

[57] ABSTRACT

An apparatus for measuring an electric field of an incoming signal implemented in a mobile communication system is disclosed. The apparatus comprises heterodyne receiver for heterodyning the incoming signal with a local signal to detect electric field information of the incoming signal, a local oscillator provided with phase-locked loop circuit, wherein the local oscillator produces a local signal through the phase-locked loop when receiving a first selection signal, and the local oscillator, when receiving a second signal, produces a local signal having a frequency which varies in accordance with a prescribed voltage change, and a controller which provides a first selection signal to the local oscillator when a normal measurement of the electric field is to be effected and provides a second selection signal to the local oscillator when a rapid measurement of the electric field is required.

14 Claims, 5 Drawing Sheets

CIRCUIT FOR MEASURING ELECTRIC FIELD BY RAPID MEASUREMENT AND NORMAL MEASUREMENT IN A MOBILE COMMUNICATION SYSTEM AND METHOD OF USING SAME

This application is a continuation-in-part of U.S. application Ser. No. 08/230,616, filed Apr. 21, 1994 now abandoned.

BACKGROUND OF THE INVENTION

The present invention relates to an electric field measuring circuit for measuring the incoming electric field level in the frequency band of a receiver, and more particularly to an electric field measuring circuit for measuring the incoming electric field level of a received signal in a mobile telephone communication system requiring rapid electric field measurement.

DESCRIPTION OF THE RELATED ART

In order to carry out the optimum exchange control in conventional mobile phone exchange systems such as for automobiles, an electric field measuring circuit is provided for measuring radiowave signals arriving from a mobile station.

FIG. 1 is a block diagram showing an example of a conventional electric field measuring circuit. In FIG. 1, a first local oscillator 220 is a phase-locked loop synthesizer made up of a voltage-controlled oscillator (hereinafter noted as a VCO) 221, an amplifier 222, a frequency divider-phase comparator (programmable counter) 224, a low-pass filter (hereinafter noted as an LPF) 225, and a reference signal generator 223, and outputs a local signal S222. An amplifier 104, a first mixer 105, a first intermediate frequency amplifier (hereinafter noted as the first IF) 106, a second local oscillator 107, an electric field level detector 108, a second mixer 109 and a demodulator 110 constitute a super-heterodyne receiver that measures an electric field level of a received signal by mixing the local signal and the received signal. The first local oscillator 220 generates a local signal S222 of frequency corresponding to the channel designating signal S211 fed from a controller 211 and supplies the signal S222 to first mixer 105. The first mixer 105 converts the received signal S103 amplified by the amplifier 104 to the first intermediate frequency signal (hereinafter referred to as the "first IF signal") S105, and supplies the first intermediate frequency signal to the first IF 106. The first IF 106 amplifies the first IF signal S105, supplies it to the second mixer 109, and in addition, sends the first IF signal S105 to the electric field level detector 108. The second mixer 109 mixes the second local signal S107 supplied from the second local oscillator 107 with the output of the first IF 106 and converts it to a second intermediate frequency signal (hereinafter referred to as the second IF signal) S109. Demodulator 110 demodulates the signal S109 and sends the demodulated data S110 to the controller 211. Electric field level detector 108 detects the electric field level of the output of the first IF, and sends the result to the controller 211 as electric field information S108.

In the above-described electric field measuring circuit of the prior art, the frequency of the local signal is determined in accordance with a channel designating signal (scale factor) indicated by the controller 211. However, after the synthesizer receives the channel designating signal from the controller 211, a period of several tens of m sec is required before the output of the synthesizer stabilizes at the desired frequency. In addition, because the controller determines the frequency of the local signal (scale factor) according to commands of the upper grade station, time is also required for the communication of signals. As a result, there are the problems that, if the electric field measuring circuit attempts measurement of the electric field of all incoming signals for all channels belonging to a frequency band (400 channels in the case of a 25 kHz channel separation and 10 MHz bandwidth) assigned to the mobile phone system it services, the measurement time will be extremely lengthy and real-time measurement will not be possible.

SUMMARY OF THE INVENTION

The object of the present invention is to provide an electric field measuring circuit that can measure electric field rapidly.

In order to attain the above object, the method of measuring an electric field of an incoming signal according to the present invention is directed to being implemented in a mobile communication system using a heterodyne receiver means and a phase-locked synthesizer means as a local oscillator. The method comprises the steps of heterodyning the incoming signal with a local signal produced by the synthesizer means when a normal measurement of the electric field is to be effected, and when a rapid measurement of the electric field is required, disconnecting the phase-locked synthesizer means, generating a local signal having a prescribed frequency change, and heterodyning the incoming signal with the local signal of the prescribed frequency change.

The frequency of the local signal changes over the entirety of a prescribed frequency range.

In order to implement the method described above, the apparatus for measuring an electric field of an incoming signal according to the present invention comprises heterodyne receiver means for heterodyning the incoming signal with a local signal to detect electric field information of the incoming signal, local oscillator means provided with phase-locked loop means, wherein the local oscillator means produces a local signal through the phase-locked loop means when receiving a first selection signal, and the local oscillator means, when receiving a second signal, produces a local signal having a frequency which varies in accordance with a prescribed voltage change, and control means which provides a first selection signal to the local oscillator means when a normal measurement of the electric field is to be effected and provides a second selection signal to the local oscillator means when a rapid measurement of the electric field is required.

The range of the prescribed voltage change is limited such that the frequency of the local signal varies over the entire range of a frequency band allocated to the mobile phone system of interest.

When a rapid measurement is to be performed, the incoming signal is heterodyned with a local signal having a frequency varying over the entire range of the frequency band allocated to the mobile phone system of interest. Accordingly, in case that a signal of any frequency within the allocated frequency band is incoming, the electric field can be detected without through the phase-locked loop means and accordingly without necessitating any communication with the upper grade station, whereby a rapid measurement is enabled.

DETAILED DESCRIPTION OF THE PREFERRED EMBODIMENTS

Figure 2:
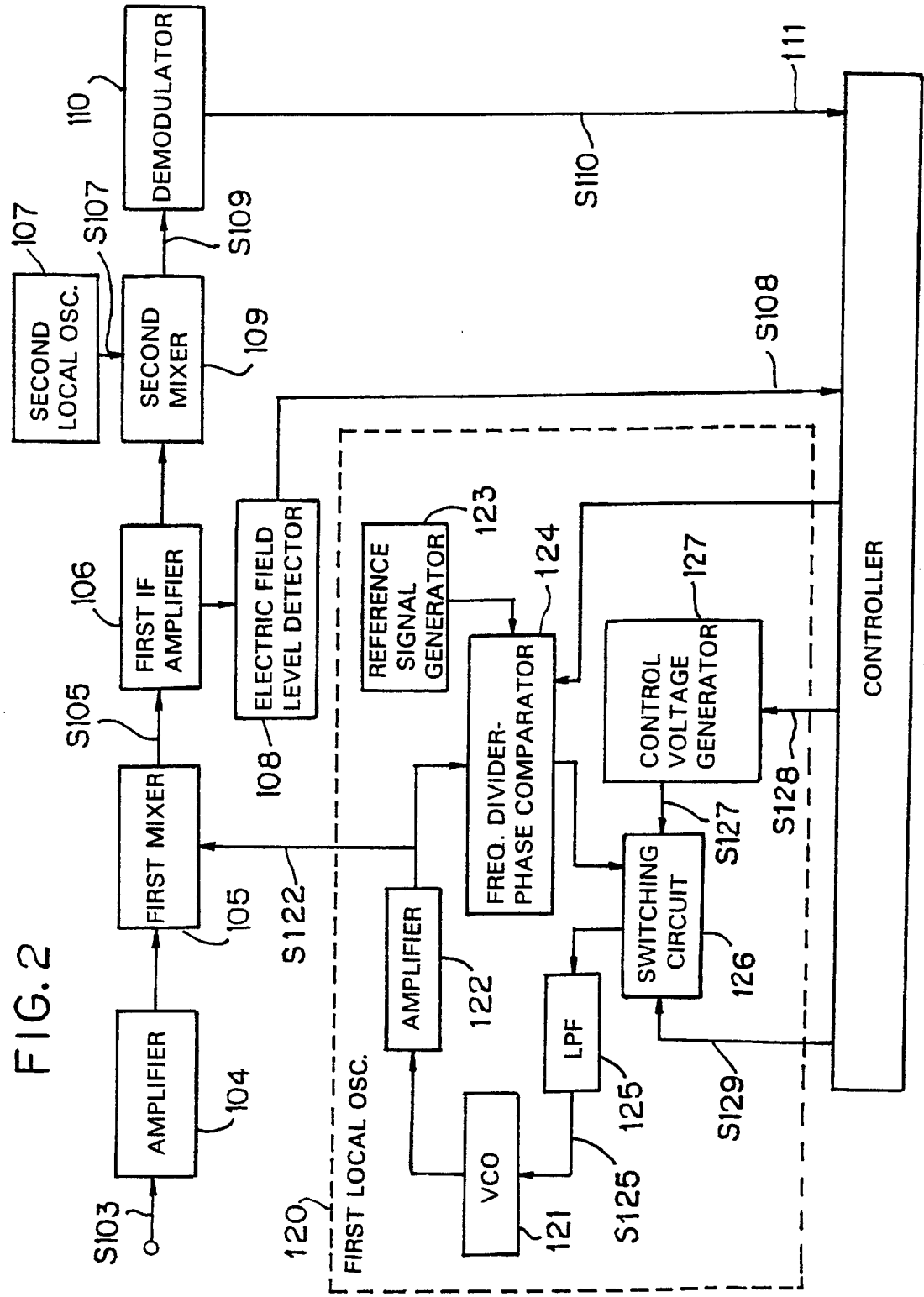
FIG. 2 is a block diagram showing an embodiment of the present invention.

FIG. 2 is a block diagram showing an embodiment of the present invention. In FIG. 2, an amplifier 104, a first mixer 105, a first IF 106, a second local oscillator 107, an electric field level detector 108, a second mixer 109 and a demodulator 110 make up a super-heterodyne receiver that measures the electric field level of a received signal by heterodyning with a local signal.

A first local oscillator 120 is provided with a phase-locked loop synthesizer made up of a VCO 121, an amplifier 122, a frequency divider-phase comparator 124, an LPF 125 and a reference signal generator 123 and outputs a local signal S122. The first local oscillator 120 of the present embodiment differs from the first local oscillator 220 of FIG. 1 in that it includes a built-in control-voltage generator 127 and a switching circuit 126. The built-in control-voltage generator 127 generates a control voltage S127 for the VCO 121 such that the frequency of the local signal S122 varies across the entire range of the frequency band for which electric field is to be detected. In the present embodiment, the switching circuit 126 is connected between the frequency divider-phase comparator 124 and LPF 125 of the phase-locked loop synthesizer, and in response to the switching signal S129, connects the frequency divider-phase comparator 124 and LPF 125 and thereby closes the phase-locked loop during normal electric field measurement and, when rapid electric field measurement is required, connects the output S127 of the built-in control-voltage generator 127 to the input of LPF 125. The reason for applying signal S127 by way of LPF 125 to VCO 121 is to prevent erroneous operation due to noise. Accordingly, signal 127 can be applied directly to the VCO 121 as the case demands.

When the controller 111 receives electric field information S108 and demodulated data S110 from the electric field level detector 108 and the demodulator 110, respectively, it notifies the upper grade station of these signals and, according to commands from the upper grade station, supplies a channel designating signal S111 to the frequency divider-phase comparator 124. The controller 111 controls the switching of the switching circuit 126 such that when normal electric field measurement should be carried out, the switching signal is made a first logic level and the input of LPF 125 is connected to the output of the frequency divider-phase comparator 124, and when rapid electric field measurement should be carried out, the switching signal S129 is made a second logic level and the input of LPF 125 is connected with the output of the built-in control-voltage generator 127. The controller 111 also generates a selection signal S128 by which it controls the built-in control-voltage generator 127, disabling the built-in control-voltage generator 127 when normal electric field measurement should be carried out, and enabling the built-in control-voltage generator 127 when rapid electric field measurement should be carried out.

The switchover between the two electric field measurement modes is executed under control of controller 111, which compares an electric field level S108 measured by electric field level detector 108 with predetermined reference value as described subsequently.

When the measured electric field level does not exceed the reference value, the controller 111 controls control-voltage generator 127 and switching circuit 126 through signals S128 and S129, respectively, to cause a rapid electric field measurement to be effected, and once the measured electric field exceeds the reference value, the controller 111 controls control-voltage generator 127 and switching circuit 126 to cause the normal electric field measurement to be effected. The rapid measurement is effected at the initial time of the electric field measurement.

Figure 7:
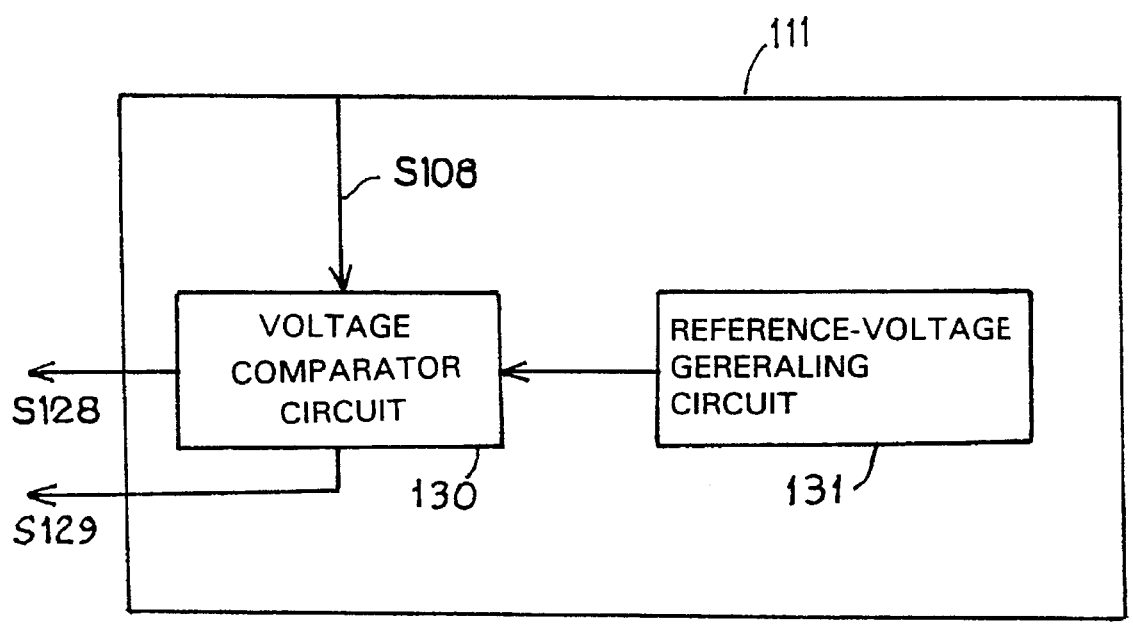
FIG. 7 is a block diagram referring to a controller shown in FIG. 2.

FIG. 7 shows a block diagram of the circuit arranged in the controller 111 for generating the signals S128 and S129. The reference-voltage generating circuit 131 generates a predetermined reference voltage. The voltage comparator circuit 130 compares the electric field level S108 with the reference voltage, and when the signal S108 is less than the reference voltage, i.e., the incoming signals are weak, the voltage comparator circuit 130 produces signal S129 of a first logic level to cause the switching circuit 126 to connect between control-voltage generator 127 and LPF, and also produces signal S128 of the first logic level to cause the control-voltage generator S127 to produce a prescribed control voltage S127. When the signal S108 is equal or higher than the reference voltage, the voltage comparator circuit 130 produces signal S129 of a second logic level to cause the switching circuit 126 to disconnect between control-voltage generator 127 and LPF, and also produces signal S128 of the second logic level to cause the control-voltage generator 127 to become disabled.

Figure 1:
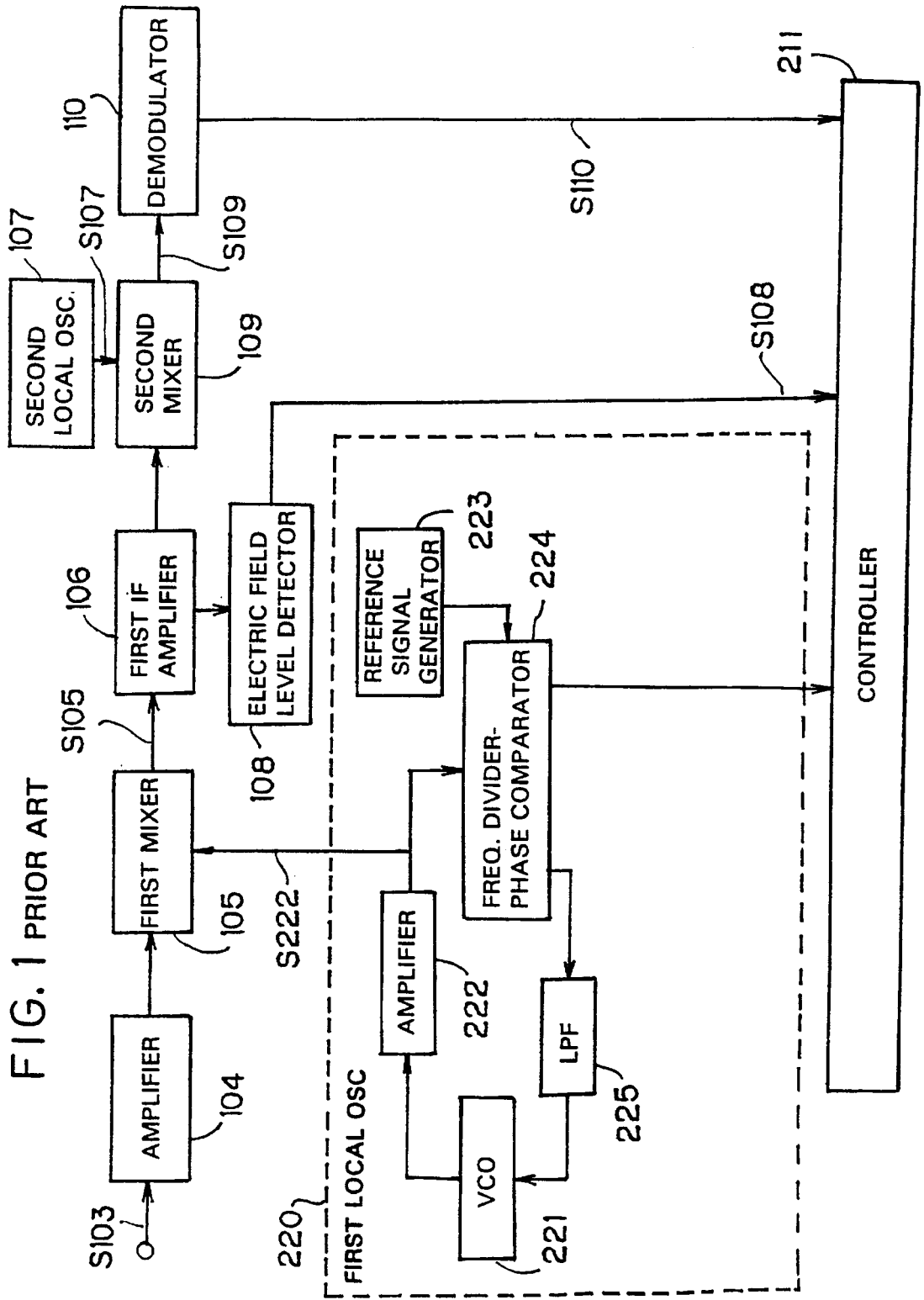
FIG. 1 is a block diagram showing an electric field measuring circuit of the prior art.

In operation, when carrying out normal electric field measurement, the phase-locked loop synthesizer in the first local oscillator 120, in the same way as for the prior art example shown in FIG. 1, generates a local signal S122 of frequency according to the channel designating signal S111 fed from the controller 111 and supplies the local signal to the first mixer 105. At the first mixer 105, incoming signal S103 that has been amplified by the amplifier 104 is converted to a first IF signal S105 and supplied to the first IF 106. At the first IF 106, the first IF signal S105 is amplified and supplied to the second mixer 109 as well as to the electric field level detector 108. At the second mixer 109, it is converted to a second IF signal S109 according to a second local signal S107 fed from the second local oscillator 107. The second IF signal S109 is demodulated by the demodulator 110, and the demodulated data S110 is sent to the controller 111. At the electric field level detector 108, the electric field level of an input signal is detected and the detected field level is sent to the controller 111 as electric field information S108.

Figure 3:
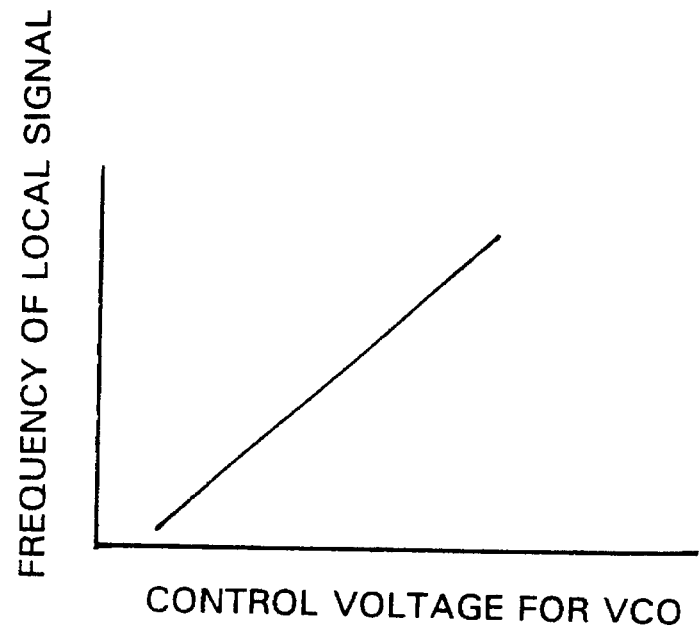
FIG. 3 is a graph showing the relation between the VCO control voltage and the local signal frequency.

When carrying out rapid electric field measurement, the switching circuit 126 is switched in response to switching signal S129 sent from the controller 111, and control voltage S127 for the VCO 121 is generated in the built-in control-voltage generator 127. In this way, the phase-locked loop is disconnected and the frequency of local signal S122 is determined according to the control voltage S127 provided in the built-in control-voltage generator 127. The control voltage S127 can cause the generation of a VCO control voltage S125 which has a relation to the frequency of the local signal S122 as shown in FIG. 3.

Figure 4:
FIG. 4 is a graph showing an example of the output of the built-in control-voltage generator.
Figure 5:
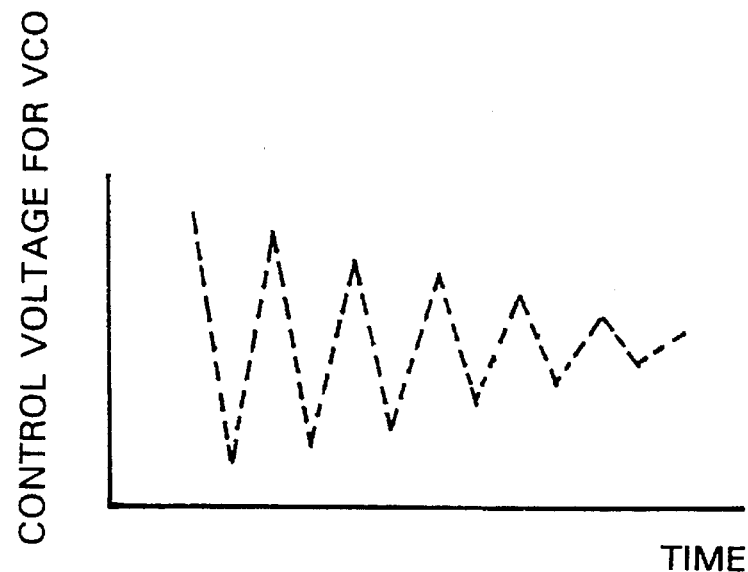
FIG. 5 is a graph showing another example of the output of the built-in control-voltage generator.
Figure 6:
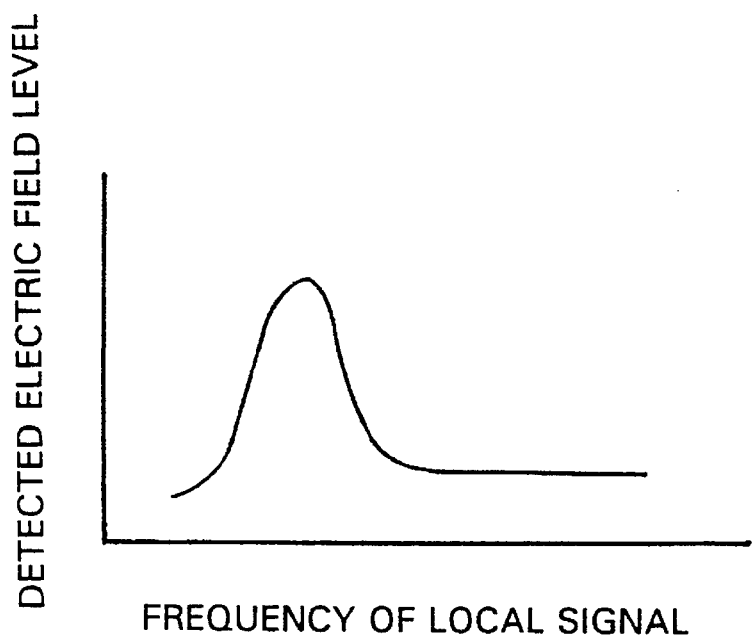
FIG. 6 is a graph showing an example of measured electric field level.

FIGS. 4 and 5 show examples of waveforms of the VCO control voltage S125 generated by the built-in control-voltage generator 127. FIG. 4 shows a sweep-type waveform and FIG. 5 shows a random search-type waveform. In either case, the range of the generated VCO control voltage corresponds to the frequency band assigned to the system of interest. FIG. 4 shows a case in which the control voltage varies linearly from minimum to maximum values. FIG. 5 shows a case in which the amplitude of sweep decreases with time to finally converge to a prescribed value. FIG. 6 shows the detected electric field level corresponding to local signal frequencies and indicates the electric field distribution of incoming signals within the frequency band. The curve of FIG. 6 can easily be obtained by using the sweep-type control voltage of FIG. 4.

Further, in case that a certain channel is interested after measurement of the electric field distribution, then by designating the channel frequency a detail measurement can be made as in the prior art, and should an interference signal be generated within the band of the system, by using the circuit of the present embodiment which has the function for both the prior art measurement and rapid measurement incorporated together, a highly efficient and short-time analysis can be performed.

As explained hereinabove, the present invention offers an advantage of, when rapid measurement of an electric field distribution of incoming signals is required, allowing measurement by disconnecting the phase-locked loop, thereby reducing the communication time for channel designation and the lock time of the synthesizer and effecting the rapid measurement in a short time.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of measuring an electric field of an incoming signal implemented in a mobile communication system, comprising the steps of:

heterodyning the incoming signal with a local signal produced by a phase-locked synthesizer means when a normal measurement of the electric field is to be effected, and when a rapid measurement of the electric field is to be effected, disconnecting the phase-locked synthesizer means, generating a local signal having a prescribed frequency change, and heterodyning the incoming signal with the local signal of the prescribed frequency change, the rapid measurement being effected at initial time of the electric field measurement and when the measured electric field level does not exceed a predetermined reference level, and the normal measurement being effected when the measured electric field level exceeds the reference level.

2. A method according to claim 1, wherein the frequency of the local signal changes over the entirety of a prescribed frequency range.

3. An apparatus for measuring an electric field of an incoming signal implemented in a mobile communication system, comprising:

heterodyne receiver means for heterodyning the incoming signal with a local signal to detect electric field information of the incoming signal;

local oscillator means provided with phase-locked loop means, wherein the local oscillator means produces the local signal through the phase locked loop means when receiving a first selection signal, and the local oscillator means, when receiving a second selection signal, produces the local signal having a frequency which varies in accordance with a prescribed voltage change, and control means which provides the first selection signal to the local oscillator means when a normal measurement of the electric field is to be effected and provides the second selection signal to the local oscillator means when a rapid measurement of the electric field is required, the control means produces the second selection signal at an initial time of the electric field measurement and at the time when a measured electric field level does not exceed a predetermined reference value, and the control means produces the first selection signal at the time when the measured electric field level exceeds the reference value.

4. An apparatus as claimed in claim 3, wherein the local oscillator means includes a control-voltage generator means for generating the prescribed voltage change in accordance with the second selection signal and also includes switching means which connects a feedback signal of the phase-locked loop means to the input of a voltage controlled oscillator provided in the phase-locked loop means to close a phase-locked loop included therein when the normal measurement of the electric field is to be performed, and connects the output of the control-voltage generator means to the voltage controlled oscillator when the rapid measurement is required.

5. An apparatus as claimed in claim 4, wherein the control-voltage generator means provides a control voltage prescribed such that the frequency of the local signal varies over the entire range of a frequency band allocated to the mobile phone system to which the apparatus for measuring an electric field belongs.

6. An apparatus as claimed in claim 5, wherein the output voltage of the control-voltage generator means is prescribed such that the output frequency of the local oscillator means varies linearly with time.

7. An apparatus as claimed in claim 5, wherein the control-voltage generator means provides the control voltage in a periodical trigonal wave with a decreasing amplitude.

8. An apparatus for measuring an electric field of an incoming signal implemented in a mobile communication system, comprising:

a heterodyne receiver which heterodynes the incoming signal with a local signal to detect electric field information of the incoming signal, a local oscillator provided with a phase-locked loop synthesizer, wherein the local oscillator produces the local signal through the phase locked loop synthesizer when receiving a first selection signal, and the local oscillator when receiving a second selection signal produces the local signal having a frequency which varies in accordance with a prescribed voltage change, and a controller which provides the first selection signal to the local oscillator when a normal measurement of the electric field is to be effected and provides the second selection signal to the local oscillator when a rapid measurement of the electric field is required, the controller produces the second selection signal at an initial time of the electric field measurement and at the time when a measured electric field level does not exceed a predetermined reference value, and the controller produces the first selection signal at the time when the measured electric field level exceeds the reference value.

9. An apparatus as claimed in claim 8, wherein the local oscillator includes a control-voltage generator for generating the prescribed voltage change in accordance with the second selection signal and also includes switching circuit which connects a feedback signal of the phase-locked loop synthesizer to the input of a voltage controlled oscillator provided in the phase-locked loop synthesizer to close a phase-locked loop included therein when the normal measurement of the electric filed is to be performed, and connects the output of the control-voltage generator to the voltage controlled oscillator when rapid measurement is required.

10. An apparatus as claimed in claim 9, wherein the control-voltage generator provides a control voltage prescribed such that the frequency of the local signal varies over the entire range of a frequency band allocated to the mobile phone system to which the apparatus for measuring an electric field belongs.

11. An apparatus as claimed in claim 10, wherein the output voltage of the control-voltage generator is prescribed such that the output frequency of the local oscillator varies linearly with time.

12. An apparatus as claimed in claim 10, wherein the control-voltage generator provides the control voltage in a periodical trigonal wave with a decreasing amplitude.

13. A method of measuring an electric field of an incoming signal implemented in a mobile communication system, comprising the steps of:

heterodyning the incoming signal with a local signal produced by phase-locked synthesizer when a normal measurement of the electric field is to be effected, and when a rapid measurement of the electric field is to be effected, disconnecting the phase-locked synthesizer, generating the local signal having a prescribed frequency change, and heterodyning the incoming signal with the local signal of the prescribed frequency change, the rapid measurement being effected at initial time of the electric field measurement and when the measured electric field level does not exceed a predetermined reference level, and the normal measurement being effected when the measured electric field level exceeds the reference level.

14. A method according to claim 13, wherein the frequency of the local signal changes over the entirety of a prescribed frequency range.

\* \* \* \* \*